US012456429B2

(12) United States Patent
Ji et al.

(10) Patent No.: US 12,456,429 B2
(45) Date of Patent: Oct. 28, 2025

(54) DISPLAY DEVICE

(71) Applicant: LG Display Co., Ltd., Seoul (KR)

(72) Inventors: Hyun-Jong Ji, Kanagawa (JP); Shinji Takasugi, Kanagawa (JP)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/957,131

(22) Filed: Nov. 22, 2024

(65) Prior Publication Data

US 2025/0201191 A1 Jun. 19, 2025

(30) Foreign Application Priority Data

Dec. 15, 2023 (JP) ................................ 2023-211643

(51) Int. Cl.
*G09G 3/3233* (2016.01)

(52) U.S. Cl.
CPC ..... *G09G 3/3233* (2013.01); *G09G 2320/043* (2013.01); *G09G 2340/16* (2013.01); *G09G 2360/12* (2013.01)

(58) Field of Classification Search
CPC ........... G09G 3/3233; G09G 2320/043; G09G 2340/16; G09G 2360/12
USPC ........................................................... 345/55
See application file for complete search history.

(56) References Cited

U.S. PATENT DOCUMENTS 10,803,810 B2 10/2020 Takasugi
2007/0146384 A1* 6/2007 Jo ........................... G09G 3/20 345/589
2019/0114962 A1* 4/2019 Jang ..................... G09G 3/2096
2020/0082762 A1 3/2020 Takasugi

FOREIGN PATENT DOCUMENTS

KR 10-2020-0029178 A 3/2020

* cited by examiner

*Primary Examiner* — Jimmy H Nguyen
(74) *Attorney, Agent, or Firm* — Fenwick & West LLP

(57) ABSTRACT

A display device includes: a display panel having a plurality of pixels each including an emitting element; and a controlling circuit configured to output an image data to the display panel based on a first frame of data and a second frame of data that is arranged after the first frame of data, wherein the controlling circuit comprises: a frame generating circuit configured to generate a luminance emphasis frame where a luminance value of a subject moving in the image data is increased relative to a luminance value of the subject in the first frame of data and a black insertion frame where a black color is inserted into the subject; and a frame outputting circuit configured to sequentially output the luminance emphasis frame and the black insertion frame to the display panel, with the black insertion frame displayed after the luminance emphasis frame.

22 Claims, 10 Drawing Sheets

| number of black colored pixel | concentration of black color |
|---|---|
| 0 | 0% |
| 1 | 12.5% |
| 2 | 25% |
| 3 | 37.5% |
| 4 | 50% |
| 5 | 62.5% |
| 6 | 75% |
| 7 | 87.5% |
| 8 | 100% |
| 9 | 100% |

DISPLAY DEVICE

CROSS-REFERENCE TO RELATED APPLICATION

The present application claims the priority benefit of Japan Patent Application No. 2023-211643, filed on Dec. 15, 2023, which is hereby incorporated by reference in its entirety.

BACKGROUND

Technical Field

The present disclosure relates to a display device, and more particularly, to a display device where deterioration of a light emitting diode is suppressed.

Discussion of the Related Art

A display device such as an organic light emitting diode (OLED) display device adopt a display method such that an emitting element such as a light emitting diode consecutively emits a light during a period after a writing of an image data of one frame is finished before a writing of an image data of a next one frame is started. In the above mentioned display method, when a subject moves between frames, a motion blur phenomenon such that the subject blurs in a human's vision or a residual image is recognized may occur.

In Republic of Korea Patent Publication No. 10-2020-0029178, a display device where a motion blur phenomenon is suppressed and display quality is improved by inserting a black image between frames is disclosed.

When a black image is inserted between frames, to maintain a luminance recognized by a human, it is required to increase a luminance value of an image of a frame before the frame for the black image. When the emitting element operates in a relatively high luminance, deterioration of the emitting element is escalated.

SUMMARY

Accordingly, the present disclosure is directed to a display device that substantially obviates one or more of the problems due to limitations and disadvantages of the related art.

An object of the present disclosure is to provide a display device where deterioration of a light emitting diode is suppressed.

Additional features and advantages of the disclosure will be set forth in the description which follows, and in part will be apparent from the description, or can be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display device includes: a display panel having a plurality of pixels each including an emitting element; and a controlling unit configured to output an image data to the display panel, wherein the controlling unit comprises: a frame generating part configured to generate a luminance emphasis frame where a luminance value of a subject moving in the image data is emphasized and a black insertion frame where a black color is inserted into the subject; and a frame outputting part configured to sequentially output the luminance emphasis frame and the black insertion frame to the display panel.

Embodiments described herein also includes a display device, comprising a display panel and a controlling circuit. The display panel includes a plurality of pixels. Each of the plurality of pixels includes a light emitting element that emit light. The controlling circuit is configured to output image data to the display panel based on a first frame of data and a second frame of data that is arranged after the first frame of data. A subject in the image data moves across the first frame of data and the second frame of data. The controlling circuit includes a frame generating circuit configured to generate for the first frame of data a luminance emphasis frame having a luminance value of the subject that is increased relative to a luminance value of the subject in the first frame of data, and a black insertion frame where a black color is inserted into the subject to replace a color of the subject in the first frame of data. The controlling circuit also includes a frame outputting circuit configured to sequentially output the luminance emphasis frame and the black insertion frame to the display panel instead of the first frame of data. The display panel displays the luminance emphasis frame and the black insertion frame after the luminance emphasis frame.

It is to be understood that both the foregoing general description and the following detailed description are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

DETAILED DESCRIPTION

Figure 1:
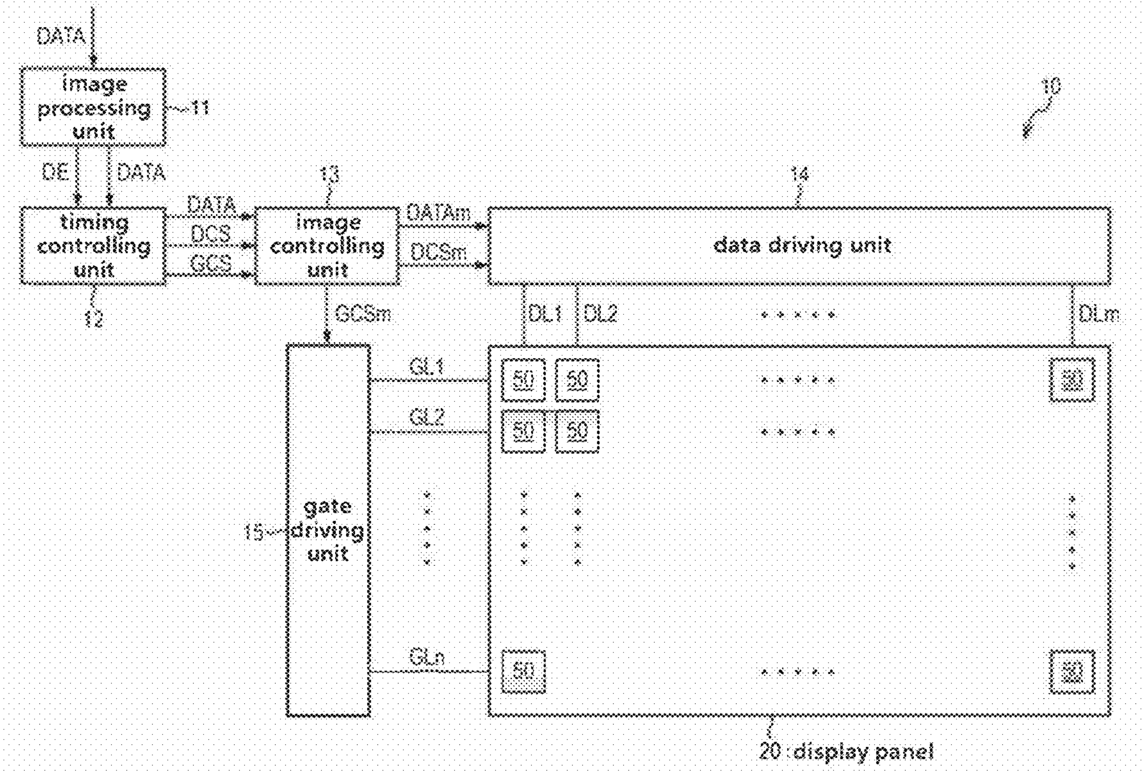
FIG. 1 is a view showing a display device according to a first embodiment of the present disclosure.

Reference will now be made in detail to embodiments of the present disclosure, examples of which can be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and can be changed as is known in the art, with the exception of steps and/or operations necessarily occurring in a particular order. Like reference numerals designate like elements throughout. Names of the respective elements used in the following explanations are selected only for convenience of writing the specification and can be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure can be sufficiently thorough and complete to assist those skilled in the art to fully understand the scope of the present disclosure. Further, the present disclosure is only defined by scopes of claims.

FIG. 1 is a view showing a display device according to a first embodiment of the present disclosure.

In FIG. 1, a display device 10 according to a first embodiment of the present disclosure includes an image processing unit 11, a timing controlling unit 12, an image controlling unit 13, a data driving unit 14, a gate driving unit 15 and a display panel 20.

The image processing unit 11 receives a data signal DATA including an image data. The image data includes a plurality of frames of data. A frame of data may be referred to as a frame hereinafter. A frame is a single image in a sequence of images that is displayed at one time on the display device 10. Each frame includes image data that represents the single image in the sequence of images that make up a video or animation. Frames are displayed for a certain period, which is a duration of time during which a single frame is displayed before it is replaced by a next frame, or at a certain rate, known as a "frame rate," which may be measured in frames per second (fps). For example, for a frame rate of 60 fps, a period of a frame would be 1/60 seconds, or approximately 16.67 milliseconds. This means each frame is displayed for about 16.67 milliseconds before a next frame is displayed.

The image processing unit 11 generates a data enable signal DE based on the data signal DATA. The image processing unit 11 may generate a vertical synchronization signal, a horizontal synchronization signal and a clock signal. The image processing unit 11 is electrically connected to the timing controlling unit 12. The image processing unit 11 transmits the data signal DATA and/or the data enable signal DE to the timing controlling unit 12.

The timing controlling unit 12 receives the data signal DATA from the image processing unit 11. Further, the timing controlling unit 12 may also receive the data enable signal DE, the vertical synchronization signal, the horizontal synchronization signal and the clock signal (hereinafter, "a driving signal"). The timing controlling unit 12 generates a data control signal DCS for driving the data driving unit 14 and a gate control signal GCS for driving the gate driving unit 15 based on the driving signal. The timing controlling unit 12 is electrically connected to the image controlling unit 13. The timing controlling unit 12 transmits the data control signal DCS, the gate control signal GCS and the data signal DATA to the image controlling unit 13.

The image controlling unit 13 receives the data control signal DCS, the gate control signal GCS and the data signal DATA from the timing controlling unit 12. The image controlling unit 13 converts the data signal DATA into a modified data signal DATAm. Further, the image controlling unit 13 converts the data control signal DCS and the gate control signal GCS into a modified data control signal DCSm and a modified gate control signal GCSm, respectively, according to the modified data signal DATAm. The image controlling unit 13 is electrically connected to the data driving unit 14 and the gate driving unit 15. The image controlling unit 13 transmits the modified data signal DATAm and the modified data control signal DCSm to the data driving unit 14. Further, the image controlling unit 13 transmits the modified gate control signal GCSm to the gate driving unit 15. A detailed process performed in the image controlling unit 13 is described below.

The data driving unit 14 receives the modified data signal DATAm and the modified data control signal DCSm from the image controlling unit 13. The data driving unit 14 converts the modified data signal DATAm into an analog data voltage for each row using the modified data control signal DCSm. The modified data control signal DCSm may include a source start pulse signal, a source shift clock signal and a source output enable signal. The source start pulse signal adjusts a start timing of a data sampling of a source driver integrated circuit in the data driving unit 14. The source shift clock signal is used for adjusting a duration of the data sampling in each source driver integrated circuit. The source output enable signal adjusts an output timing of the data voltage from the data driving unit 14. In some embodiments, the source start pulse signal initiates a transfer of a frame of data to pixel rows, the source shift clock signal coordinates a sequential loading of the frame of data into the pixels, and the source output enable signal activates output to pixels 50 of the display panel 20, allowing a frame of data to be displayed on the display panel 20.

The data driving unit 14 is electrically connected to each of a plurality of pixels 50 in the display panel 20 through a plurality of data lines DL1 to DLm. The data driving unit 14 supplies the data voltage to each of the plurality of pixels 50 through the plurality of data lines DL1 to DLm. A conversion duration and an output duration of the data voltage in the data driving unit 14 may be changed by adjusting output widths of the data enable signal DE and the source output enable signal, respectively. The data driving unit 14 consecutively supplies the data voltage to each of the plurality of pixels 50 through the plurality of data lines DL1 to DLm in synchronization with an output timing of a gate signal. The data voltages supplied to the plurality of pixels 50 correspond to luminance values of the plurality of pixels 50.

The gate driving unit 15 receives the modified gate control signal GCSm from the image controlling unit 13. The gate driving unit 15 is electrically connected to the display panel 20 through a plurality of gate lines GL1 to GLn. The gate driving unit 15 outputs the gate signal to each of the plurality of gate lines GL1 to GLn based on the modified gate control signal GCSm.

The gate driving unit 15 may include an inner circuit such as a level shifter, a shift register, a delay circuit and a flip flop. The gate driving unit 15 consecutively generates a control signal such as a gate start pulse signal, a gate shift clock signal and a gate output enable signal. The gate start pulse signal adjusts an operation start timing of a gate driver integrated circuit in the gate driving unit 15. The gate shift clock signal is commonly inputted to the gate driver integrated circuit and adjusts a shift timing of the gate signal (scan signal). The gate driving unit 15 consecutively generates the gate signal by shifting the gate pulse signal according to the gate shift clock signal. The gate driving unit 15 supplies the gate signal to each of the plurality of gate lines GL1 to GLn. Each of the plurality of pixels 50 has an active state due to the gate signal supplied through the plurality of gate lines GL1 to GLn. The gate driving unit 15 adjusts an output width of the gate signal based on output widths of the data enable signal DE and the gate output enable signal.

The display panel 20 is configured to display an image or a sequence of images output from the display device 10. A video is provided to a user by consecutively outputting a plurality of images based on the plurality of frames of data. The display panel 20 includes the plurality of pixels 50 arranged in each pixel region with a matrix type. Each frame of data includes values corresponding to the plurality of pixels in the display panel 20. Each of the plurality of pixels is associated with a pixel value (represents a color of a corresponding pixel) and a luminance value (represents a brightness of a corresponding pixel). In some cases, an area of a frame is associated with a same pixel value and/or a same luminance value. The pixel regions are defined by intersections of the plurality of gate lines GL1 to GLn (n is a positive integer) extending from the gate driving unit 15 along a row direction and the plurality of data lines DL1 to DLm (m is a positive integer) extending from the data driving unit 14 along a column direction. Each of the plurality of pixels 50 includes a light emitting element (also referred to as an emitting element). For example, the emitting element in each of the plurality of pixels 50 includes a light emitting diode OLED. The light emitting diode emits a light according to a current flowing therethrough. As a current density through the light emitting diode OLED increases, a luminance of the light emitted from the light emitting diode OLED linearly increases. An operation of the light emitting diode OLED with a relatively high luminance non-linearly escalates a deterioration speed of the emitting element. When the light emitting diode OLED is deteriorated due to the operation with a relatively high luminance, the luminance of the light emitted from the light emitting diode OLED corresponding to the same current density is reduced. Accordingly, as an operation time of the light emitting diode OLED with a relatively high luminance increases, a lifespan of the emitting element is reduced.

Figure 2:
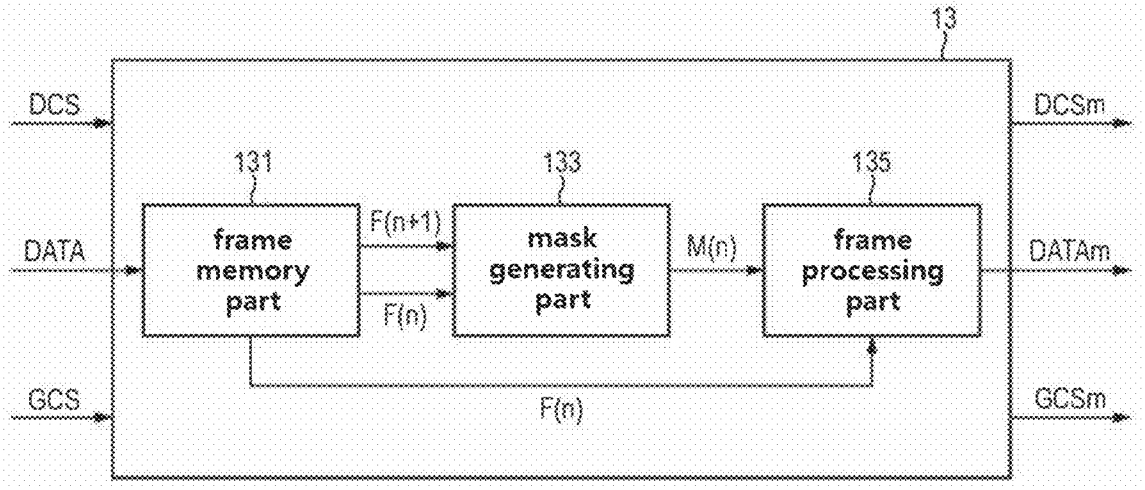
FIG. 2 is a view showing an image controlling unit of a display device according to a first embodiment of the present disclosure.

FIG. 2 is a view showing an image controlling unit of a display device according to a first embodiment of the present disclosure.

In FIG. 2, the image controlling unit 13 may include or function as a motion detecting unit that identifies a subject moving between frames based on a difference between frames. The image controlling unit 13 includes a frame memory part 131, a mask generating part 133 and a frame processing part 135. In some embodiments, each of the frame memory part 131, the mask generating part 133, and/or the frame processing part 135 is a circuit. Accordingly, the frame memory part 131, the mask generating part 133, and the frame processing part 135 may also be referred to as a frame memory circuit 131, a mask generating circuit 133, and/or a frame processing circuit 135, respectively.

The frame memory part 131 receives the data signal DATA. The data signal DATA includes one or more frames of data F of the image displayed by the display panel 20 of the display device 10. The frame memory part 131 stores the frames of data F. The frames of data F include data of an nth image frame F(n) and an (n+1)th image frame F(n+1). When the image controlling unit 13 displays the nth image frame F(n) through the display panel 20 of the display device 10, the frame memory part 131 transmits the data corresponding to the nth image frame F(n) and the (n+1)th image frame F(n+1) to the mask generating part 133. The data corresponding to the nth image frame F(n) and the (n+1)th image frame F(n+1) may be referred to as the nth image frame F(n) and the (n+1)th image frame F(n+1), respectively, hereinafter.

The mask generating part 133 receives the nth image frame F(n) and the (n+1)th image frame F(n+1) from the frame memory part 131. The mask generating part 133 generates an nth mask frame M(n) based on the nth image frame F(n) and the (n+1)th image frame F(n+1). A detailed process for generating the nth mask frame M(n) may be described below. The mask generating part 133 transmits the nth mask frame M(n) to the frame processing part 135. The mask generating part 133 may generate the mask frames for all frames displayed through the display panel 20.

The frame processing part 135 receives the nth image frame F(n) from the frame memory part 131. Further, the frame processing part 135 receives the nth mask frame M(n) from the mask generating part 133. The frame processing part 135 generates an nth luminance emphasis frame HBF(n) and an nth black insertion frame BIF(n) corresponding to the nth image frame F(n) based on the nth image frame F(n) and the nth mask frame M(n). A detailed process for generating the nth mask frame M(n), the nth luminance emphasis frame HBF(n) and the nth black insertion frame BIF(n) may be described below. The frame processing part 135 may generate the luminance emphasis frames and the black insertion frames for all frames displayed through the display panel 20. The frame processing part 135 transmits the modified data signal DATAm including the nth luminance emphasis frame HBF(n) and the nth black insertion frame BIF(n) to the data driving unit 14.

Figure 3:
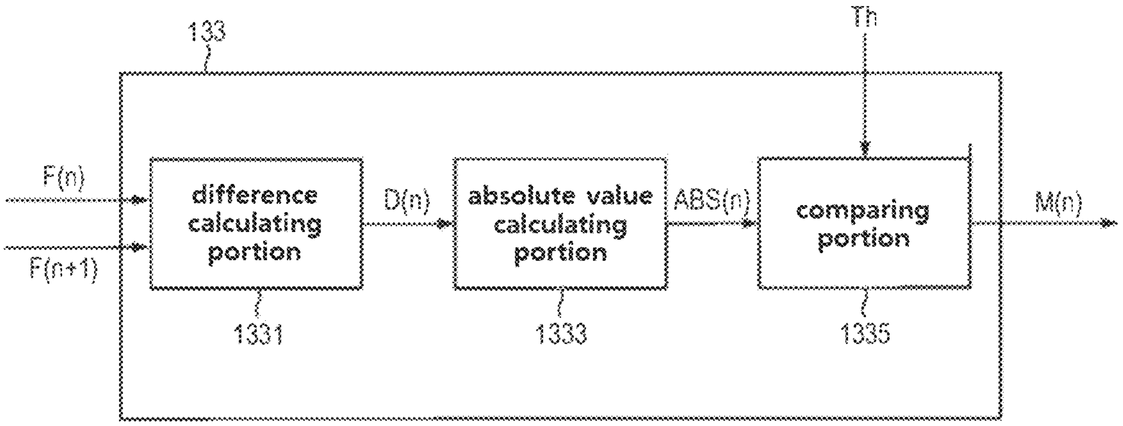
FIG. 3 is a view showing a mask generating part of an image controlling unit of a display device according to a first embodiment of the present disclosure.

FIG. 3 is a view showing a mask generating part of an image controlling unit of a display device according to a first embodiment of the present disclosure.

In FIG. 3, the mask generating part 133 includes a difference calculating portion 1331, an absolute value calculating portion 1333 and a comparing portion 1335. In some embodiments, each of the difference calculating portion 1331, the absolute value calculating portion 1333, and/or the comparing portion 1335 may be a circuit. Accordingly, the difference calculating portion 1331, the absolute value calculating portion 1333, and/or the comparing portion 1335 may also be referred to as a difference calculation circuit 1331, an absolute value calculation circuit 1333, and/or a comparing circuit 1335, respectively.

The difference calculating portion 1331 receives the nth image frame F(n) and the (n+1)th image frame F(n+1) from the frame memory part 131. The difference calculating portion 1331 calculates an nth difference D(n) between the nth image frame F(n) and the (n+1)th image frame F(n+1). For example, the difference calculating portion 1331 subtracts a pixel value of the nth image frame F(n) from a corresponding pixel value of the (n+1)th image frame F(n+1). The difference calculating portion 1331 calculates the differences for all pixel values in the nth image frame F(n) and the (n+1)th image frame F(n+1). The difference calculating portion 1331 transmits the calculated nth difference D(n) to the absolute value calculating portion 1333.

The absolute value calculating portion 1333 receives the nth difference D(n) between the nth image frame F(n) and the (n+1)th image frame F(n+1) from the difference calculating portion 1331. The absolute value calculating portion 1333 calculates an nth absolute value ABS(n) of the nth difference D(n). When the image transitions from the nth image frame F(n) to the (n+1)th image frame F(n+1), a portion of the pixel having a relatively great change of the pixel value has a relatively great absolute value. When the image transitions from the nth image frame F(n) to the (n+1)th image frame F(n+1), a portion of the pixel having a relatively small change of the pixel value has a relatively small absolute value. The absolute value calculating portion 1333 transmits the calculated nth absolute value ABS(n) to the comparing portion 1335.

The comparing portion 1335 receives the nth absolute value ABS(n) from the absolute value calculating portion 1333. The comparing portion 1335 compares the nth absolute value ABS(n) with a predetermined threshold value Th and generates the nth mask frame M(n) based on a corresponding comparison result. For example, the comparing portion 1335 determines whether the nth absolute value ABS(n) is greater than the threshold value. In some embodiments, the nth mask frame M(n) is a binary image with binary pixel values, e.g., "1" or "0". When the absolute value corresponding to a pixel is judged greater than the threshold value Th, the comparing portion 1335 assigns a first binary value (e.g., "1") to the corresponding pixel. Further, when the absolute value corresponding to another pixel is judged smaller than the threshold value Th, the comparing portion 1335 assigns a second binary value (e.g., "0") to the corresponding pixel. The comparing portion 1335 compares the absolute values corresponding to all pixels in the nth absolute values ABS(n) with the threshold value Th and assigns "1" or "0" to a portion corresponding to each pixel based on the comparison result. The portion corresponding to the pixel assigned to "1" has a relatively great absolute value of the nth difference D(n). As a result, the comparing portion 1335 judges that the portion corresponding to the pixel assigned to "1" is the subject moving between the nth image frame F(n) and the (n+1)th image frame F(n+1). The portion corresponding to the pixel assigned to "0" has a relatively small absolute value of the nth difference D(n). As a result, the comparing portion 1335 judges that the portion corresponding to the pixel assigned to "0" is the subject not moving between the nth image frame F(n) and the (n+1)th image frame F(n+1). Note, it is merely an example embodiment in which a pixel that corresponds to a relatively small absolute value is assigned to "0", and a pixel that corresponds to a relatively large absolute value is assigned to "1". In some embodiments, a pixel that corresponds to a relatively small absolute value is assigned to "1", and a pixel that corresponds to a relatively large absolute value is assigned to "0".

The comparing portion 1335 generates a mask frame (also referred to as a mask) where "1" or "0" is assigned to each pixel. The generated mask is the nth mask frame M(n) for specifying the moving subject and is used in the frame processing part 135. The nth mask frame M(n) may be represented as a binary image. The comparing portion 1335 transmits the nth mask frame M(n) to the frame processing part 135.

When it is determined that the subject moving between the nth image frame F(n) and the (n+1)th image frame F(n+1) does not exist, the comparing portion 1335 may generate the nth mask frame M(n) where "0" is assigned to each pixel.

Although the difference calculating portion 1331 calculates the nth difference D(n) based on the consecutive nth and (n+1)th image frames F(n) and F(n+1) in a first embodiment of FIG. 3, the difference calculating portion 1331 may calculate the nth difference D(n) based on non-consecutive image frames in another embodiment. For example, the difference calculating portion 1331 may calculate the nth difference D(n) based on the nth image frame F(n) and the (n+2)th image frame F(n+2). The difference calculating portion 1331 may use a first frame and a second frame among the plurality of frames for calculating the nth difference D(n), where the second frame is arranged after the first frame, and the first frame and the second frame may or may not be consecutive frames or may be consecutive frames without any intermediate frame between the first frame and the second frame. Further, in some embodiments, the difference calculating portion 1331 may calculate the nth difference D(n) based on a luminance value instead of the pixel value.

In a first embodiment of FIG. 3, the threshold value Th is inputted to the comparing portion 1335 from an exterior of the mask generating part 133. The threshold value Th may be stored in the comparing portion 1335 in advance, or may be stored in an additional memory portion of the mask generating part 133 in advance. Further, the threshold value Th may be a fixed value or a variable value.

Figure 4A:
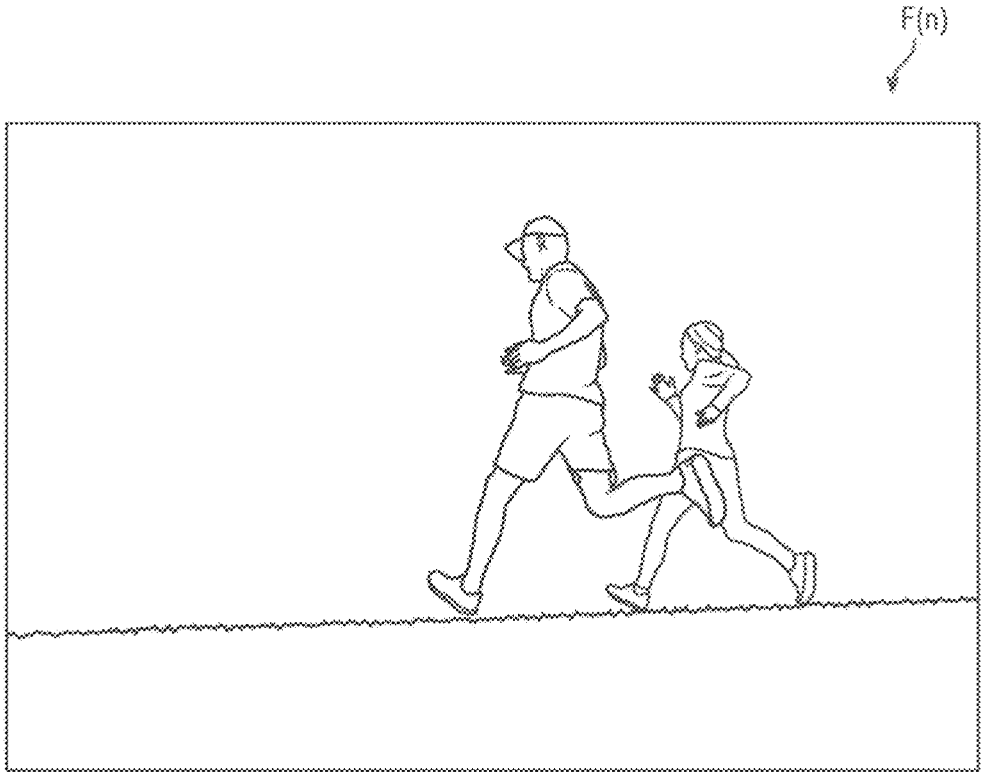
FIG. 4A is a view showing an nth image frame processed by an image controlling unit of a display device according to a first embodiment of the present disclosure.
Figure 4B:
FIG. 4B is a view showing an nth mask frame generated by a mask generating part of a display device according to a first embodiment of the present disclosure.

FIG. 4A is a view showing an nth image frame processed by an image controlling unit of a display device according to a first embodiment of the present disclosure, and FIG. 4B is a view showing an nth mask frame generated by a mask generating part of a display device according to a first embodiment of the present disclosure.

The frame memory part 131 transmits the nth image frame F(n) of FIG. 4A and the (n+1)th image frame F(n+1) after the nth image frame F(n) to the mask generating part 133. As illustrated in FIG. 4A, when the image transitions from the nth image frame F(n) to the (n+1)th frame F(n+1), only two persons move and a background is not changed. Hereinafter, a moving subject portion (the persons in FIG. 4A) may be referred to as "a subject." Further, a fixed subject portion (the background in FIG. 4A) may be referred to as "a background." The absolute value calculating portion 1333 outputs the nth absolute value ABS(n), including absolute values for a portion of the nth image frame F(n) corresponding to the subject, and absolute values for a remaining portion of the nth image frame F(n) corresponding to the background. The absolute values for the portion corresponding to the subject are higher than absolute values corresponding to the background. The comparing portion 1335 determines that the persons is a moving subject based on the nth absolute value ABS(n) transmitted from the absolute value calculating portion 1333. The comparing portion 1335 determines that the background is a fixed subject based on the corresponding nth absolute value ABS(n). The comparing portion 1335 generates the nth mask frame M(n) as shown in FIG. 4B based on the nth absolute value ABS(n). In FIG. 4B, the subject is represented by a white color (e.g., a pixel value "1") and the background is represented by a black color (e.g., a pixel value "0"). The mask generating part 133 transmits the nth mask frame M(n) to the frame processing part 135.

Figure 5:
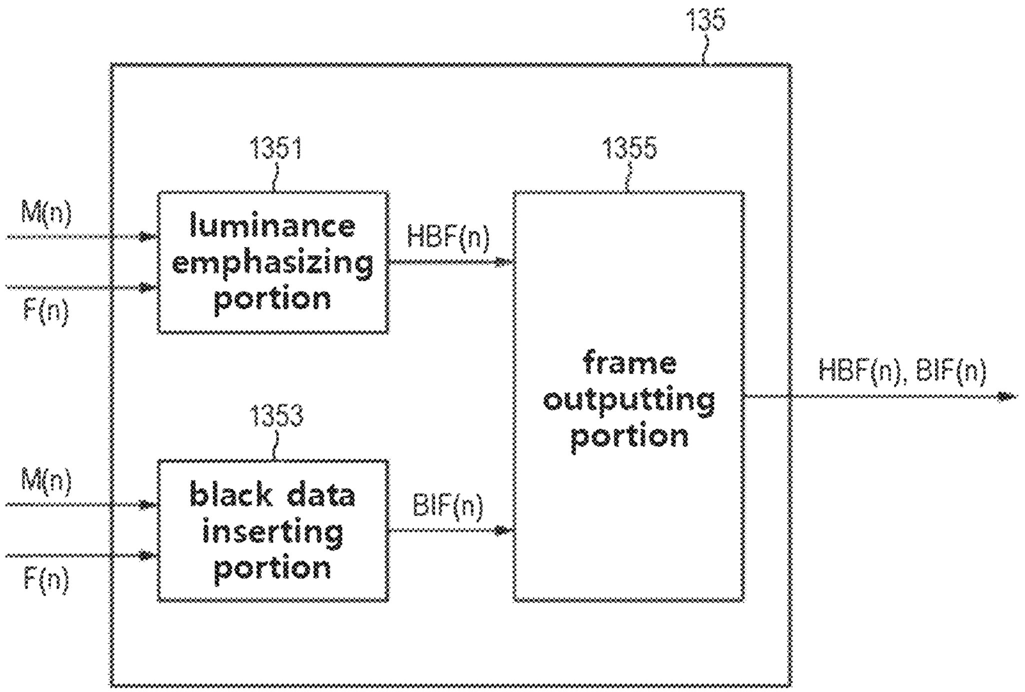
FIG. 5 is a view showing a frame processing part of a display device according to a first embodiment of the present disclosure.

FIG. 5 is a view showing a frame processing part of a display device according to a first embodiment of the present disclosure.

In FIG. 5, the frame processing part 135 includes a luminance emphasizing portion 1351, a black data inserting portion 1353 and a frame outputting portion 1355. In some embodiments, each of the luminance emphasizing portion 1351, the black data inserting portion 1353, and/or the frame outputting portion 1355 may be a circuit. Accordingly, the luminance emphasizing portion 1351, the black data inserting portion 1353, and/or the frame outputting portion 1355 may also be referred to as a luminance emphasizing circuit 1351, a black data inserting circuit 1353, and/or a frame outputting circuit 1355.

The luminance emphasizing portion 1351 receives the nth image frame F(n) from the frame memory part 131. The luminance emphasizing portion 1351 receives the nth mask frame M(n) from the mask generating part 133. The luminance emphasizing portion 1351 generates an nth luminance emphasis frame HBF(n) based on the nth image frame F(n) and the nth mask frame M(n). The luminance emphasizing portion 1351 may include or function as a frame generating portion configured to generate the nth luminance emphasis frame HBF(n).

The luminance emphasizing portion 1351 performs a masking treatment using the nth image frame F(n) and the nth mask frame M(n) and extracts the subject from the nth image frame F(n). The luminance emphasizing portion 1351 generates an image (frame) where a luminance value of the extracted subject is higher than a luminance value of the subject of the nth image frame F(n). In the generated image, a luminance value of the background is same as a luminance value of the background of the nth image frame F(n) by the luminance emphasizing portion 1351. The luminance emphasizing portion 1351 generates the nth luminance emphasis frame HBF(n) where only the luminance value of the subject increases based on the nth image frame F(n) and the nth mask frame M(n). In the nth luminance emphasis frame HBF(n), the background has a luminance value the same as a luminance value of the background of the nth image frame F(n). The luminance emphasizing portion 1351 transmits the nth luminance emphasis frame HBF(n) to the frame outputting portion 1355.

The black data inserting portion 1353 receives the nth image frame F(n) from the frame memory part 131. Further, the black data inserting portion 1353 receives the nth mask frame M(n) from the mask generating part 133. The black data inserting portion 1353 generates an nth black insertion frame BIF(n) based on the nth image frame F(n) and the nth mask frame M(n). The black data inserting portion 1353 may include or function as a frame generating portion for generating the nth black insertion frame BIF(n).

The black data inserting portion 1353 performs a masking treatment using the nth image frame F(n) and the nth mask frame M(n) and extracts the subject from the nth image frame F(n). The black data inserting portion 1353 generates an image (frame) where a black color is inserted into the extracted subject based on the nth image frame F(n). In the generated image, a luminance value of the background is the same as a luminance value of the background of the nth image frame F(n) by the black data inserting portion 1353. The black data inserting portion 1353 generates the nth black insertion frame BIF(n) where the black color is inserted into only the subject based on the nth image frame F(n) and the nth mask frame M(n). In the nth black insertion frame BIF(n), the background has a luminance value the same as a luminance value of the background of the nth image frame F(n). The black data inserting portion 1353 transmits the nth black insertion frame BIF(n) to the frame outputting portion 1355.

The black data inserting portion 1353 generates the image (frame) where the black color is inserted into the subject. However, in some embodiments, a color inserted into the subject is not limited to the black color having a minimum gray level (e.g., a minimum luminance level). In some embodiments, the black data inserting portion 1353 may generate the nth black insertion frame BIF(n) using a color (e.g., gray) which has a luminance value higher than that of the black color having a minimum luminance value and lower than the subject of the nth image frame F(n).

The frame outputting portion 1355 receives the nth luminance emphasis frame HBF(n) from the luminance emphasizing portion 1351. Further, the frame outputting portion 1355 receives the nth black insertion frame BIF(n) from the black data inserting portion 1353. The frame outputting portion 1355 transmits the nth luminance emphasis frame HBF(n) and the nth black insertion frame BIF(n) to the data driving unit 14. The image controlling unit 13 generates the modified data control signal DCSm and the modified gate control signal GCSm for sequentially displaying the luminance emphasis frame and the black insertion frame during one frame period for displaying the nth image frame F(n). The image controlling unit 13 may generate the modified data control signal DCSm and the modified gate control signal GCSm such that a sum of the period where the nth luminance emphasis frame HBF(n) is displayed and the period where the nth black insertion frame BIF(n) is displayed corresponds to a frame rate of the nth image frame F(n). For example, when the frame rate of the nth image frame F(n) is about 60 fps (frames per second), the image controlling unit 13 may generate the modified data control signal DCSm and the modified gate control signal GCSm such that the sum of the period where the nth luminance emphasis frame HBF(n) is displayed and the period where the nth black insertion frame BIF(n) is displayed becomes 1/60 sec of a period where the nth image frame F(n) is displayed. The image controlling unit 13 adjusts the data driving unit 14 and the gate driving unit 15 such that the nth luminance emphasis frame HBF(n) and the nth black insertion frame BIF(n) are sequentially displayed in the display panel 20 based on the modified data control signal DCSm and the modified gate control signal GCSm.

In some embodiments, a sum of a first period during which the nth luminance emphasis frame HBF(n) is displayed and a second period during which the nth black insertion frame BIF(n) is displayed is equal to the period of the nth image frame F(n). For example, if the period of the nth image frame F(n) is 1/60 second, a sum of the first period and the second period is equal to 1/60 seconds. In some embodiments, the first period and the second period are same. For example, if the period of the nth image frame F(n) is 1/60 seconds, each of the first period and the second period is equal to 1/120 seconds.

Figure 6:
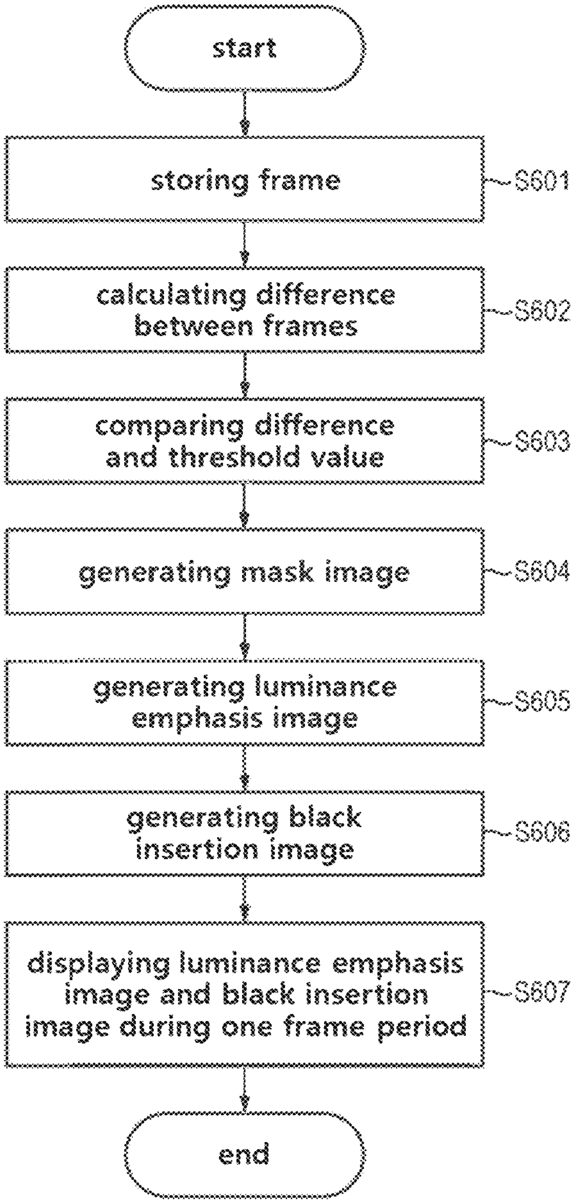
FIG. 6 is a view showing a process performed by an image controlling unit of a display device according to a first embodiment of the present disclosure.

FIG. 6 is a view showing a process performed by an image controlling unit of a display device (e.g., image controlling unit 13 of the display device 10) according to a first embodiment of the present disclosure.

In step S601, the image controlling unit 13 stores a first frame and a second frame among a plurality of frames in the frame memory part 131.

In step S602, the image controlling unit 13 calculates a difference of each pixel between the first frame and the second frame and determines an absolute value of the difference of the calculated difference.

In step S603, the image controlling unit 13 compares the absolute value of the calculated difference with the threshold value.

In step S604, the image controlling unit 13 generates a mask frame (mask image) based on the comparison result.

In step S605, the image controlling unit 13 generates a luminance emphasis frame (luminance emphasis image) based on the mask image and the first frame.

In step S606, the image controlling unit 13 generates the black insertion frame (black insertion image) based on the mask image and the first frame.

In step S607, the image controlling unit 13 sequentially displays the luminance emphasis image and the black insertion image during one frame period corresponding to the first frame.

Figure 7:
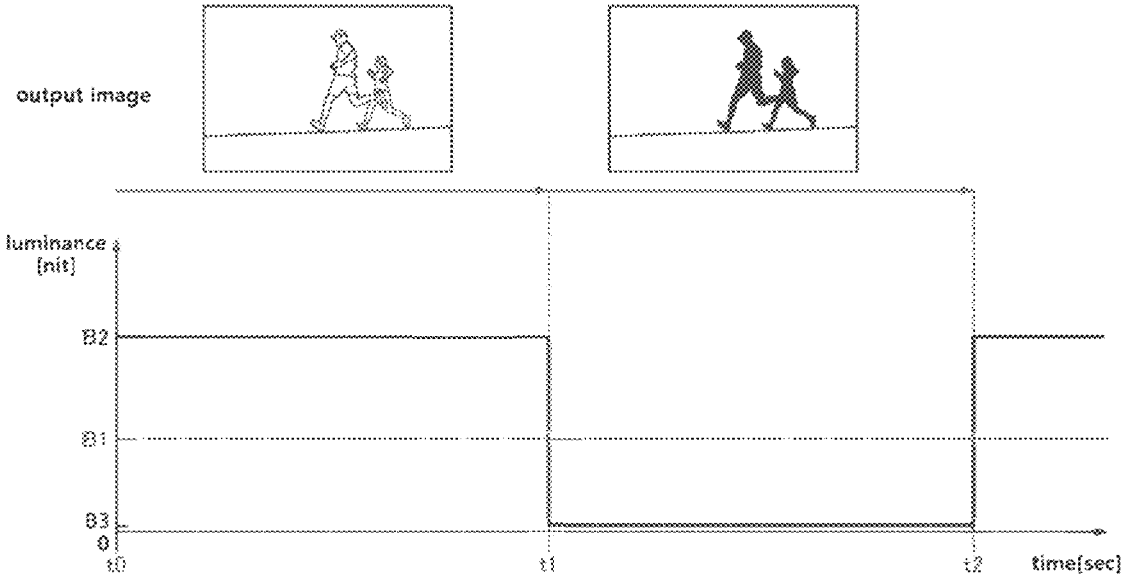
FIG. 7 is a view showing a luminance change of an image frame with respect to a time displayed by a display device according to a first embodiment of the present disclosure.

FIG. 7 is a view showing a luminance change of an image frame with respect to a time displayed by a display device according to a first embodiment of the present disclosure.

In FIG. 7, a vertical axis represents a luminance value of a light emitted from a pixel in the image frame, and a horizontal axis represents a time. During a period from a zeroth timing t0 to a first timing t1, the nth luminance emphasis frame HBF(n) 710 is displayed in the display device 10. During a period from the first timing t1 to a second timing t2, the nth black insertion frame BIF(n) 720 is displayed in the display device 10. The period from the zeroth timing t0 to the second timing t2 is a period for displaying one frame and corresponds to a frame rate for displaying the nth image frame F(n). For example, when the frame rate of the nth image frame F(n) is about 60 fps, the period from the zeroth timing t0 to the second timing t2 has a length of about 1/60 sec. The solid line represents a luminance of one pixel among the pixels corresponding to the subject, and the dash-single dotted line represents a luminance of one pixel among the pixels corresponding to the background. For convenience of illustration, it is assumed that the light emitted from each pixel in the nth image frame F(n) has a first luminance B1.

During the period from the zeroth timing t0 to the second timing t2, the pixel corresponding to the background which is not changed between the nth image frame F(n) and the (n+1)th image frame F(n+1) has the constant first luminance B1 (dash-single dotted line). In the nth luminance emphasis frame HBF(n) and the nth black insertion frame BIF(n), the background has the same luminance.

During the period from the zeroth timing t0 to the second timing t2, the luminance of the pixel corresponding to the subject moving between the nth image frame F(n) and the (n+1)th image frame F(n+1) is changed (solid line). During the period from the zeroth timing t0 to the first timing t1, the pixel corresponding to the subject has a second luminance B2 higher than the first luminance B1. During the period from the first timing t1 to the second timing t2, the pixel corresponding to the subject has a third luminance B3 lower than the first luminance B1. For example, the third luminance B3 of the solid line during the period from the first timing t1 to the second timing t2 may be a minimum luminance. The second luminance B2 during the period from the zeroth timing t0 to the first timing t1 corresponds to the luminance of the pixel in the subject of the nth luminance emphasis frame HBF(n). The luminance during the period from the first timing t1 to the second timing t2 (solid line) corresponds to the luminance of the pixel in the subject of the nth black insertion frame BIF(n).

Human vision recognizes brightness due to an integration of luminance with respect to time. During the period from the zeroth timing t0 to the second timing t2, the pixel constituting the moving subject in the nth image frame F(n) may have the constant first luminance B1. The pixel of the nth luminance emphasis frame HBF(n) is assumed to have a first luminance integration value I1 during the period from the zeroth timing t0 to the first timing t1. The pixel of the nth black insertion frame BIF(n) is assumed to have a second integration value I2 during the period from the first timing t1 to the second timing t2. It may be adjusted such that the sum of the first and second integration values I1 and I2 becomes equal to the integration value of the first luminance B1 during the period from the zeroth timing t0 to the second timing t2. The above adjustment may be performed on all pixels in the display panel 20. The nth luminance emphasis frame HBF(n) (from the zeroth timing t0 to the first timing t1) and the nth black insertion frame BIF(n) (from the zeroth timing t0 to the second timing t2) consecutively displayed are recognized to have the same brightness as the nth image frame F(n) during one frame period. A user consecutively watching the nth luminance emphasis frame HBF(n) (from the zeroth timing t0 to the first timing t1) and the nth black insertion frame BIF(n) (from the first timing t1 to the second timing t2) recognizes the same brightness as the nth image frame F(n) (from the zeroth timing to to the second timing t2). For example, a first frame period (from the zeroth timing t0 to the second timing t2) may be about 1/60 sec. Each of the period from the zeroth timing t0 to the first timing t1 and the period from the first timing t1 to the second timing t2 may be about 1/120 sec. An average luminance of the pixels corresponding to the subject in the nth image frame F(n) may be the first luminance B1, and an average luminance of the pixels corresponding to the subject in the nth luminance emphasis frame HBF(n) may be the second luminance B2. The second luminance B2 may be about twice the first luminance B1.

When the moving subject does not exist between frames, the image frame is displayed with a constant average luminance through one frame period (from the zeroth timing t0 to the second timing t2). The frame processing part 135 generates two image frames having the same average luminance as the nth luminance emphasis frame HBF(n) and the nth black insertion frame BIF(n). The frame processing part 135 transmits the generated two frames as the nth luminance emphasis frame HBF(n) and the nth black insertion frame BIF(n) to the data driving unit 14.

When the moving subject between frames does not exist, the mask generating part 133 generates the nth mask frame M(n) where "0" is assigned to all pixels. The luminance emphasizing portion 1351 generates a first image frame having the same average luminance as the nth image frame F(n) based on the nth mask frame M(n). Differently from the nth luminance emphasis frame HBF(n) generated when the moving subject is detected, the first image frame does not have a portion where the luminance is emphasized. Further, the black data inserting portion 1353 generates a second image frame having the same average luminance as the nth image frame F(n) based on the nth mask frame M(n).

Differently from the nth black insertion frame BIF(n) generated when the moving subject is detected, the second image frame does not have a portion substituted by a black color. When the moving subject between frames does not exist, the first image frame generated by the luminance emphasis portion 1351 has the same average luminance as the second image frame generated by the black data inserting portion 1353. Further, the first image frame may be the same as the second image frame. During one frame period, the first image frame is initially displayed and then the second image frame is displayed. When the moving subject between frames does not exist, the emitting element is not driven with a relatively high luminance and is driven with a luminance similar to the luminance of the nth image frame F(n). As a result, deterioration of the emitting element such as the light emitting diode is suppressed when a static image is displayed.

In the display device according to a first embodiment of the present disclosure, a black color is inserted into only a portion of the moving subject between frames. As a result, the number of the emitting elements driven with a relatively high luminance to suppress a motion blur phenomenon and to improve a display quality is minimized or at least reduced. Further, when a static image is displayed, the emitting element is not driven with a relatively high luminance. Accordingly, deterioration of the emitting element such as the light emitting diode is suppressed and a lifespan of a display device is improved.

Figure 8:
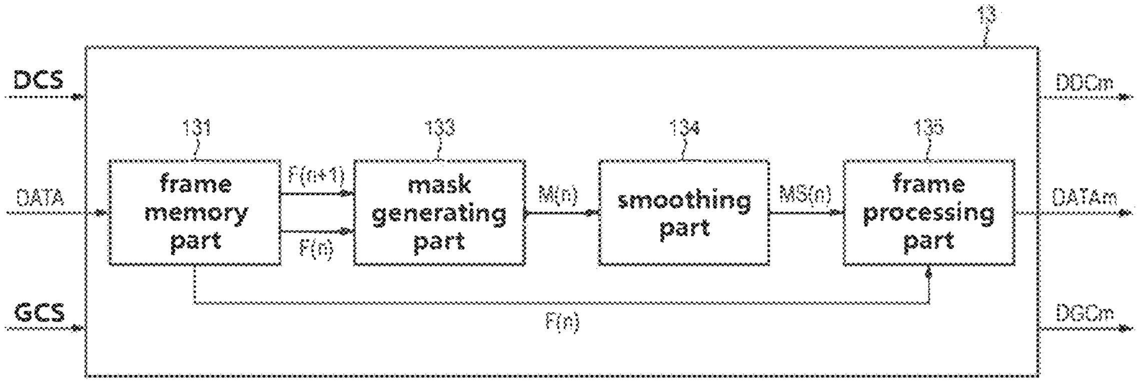
FIG. 8 is a view showing an image controlling unit of a display device according to a second embodiment of the present disclosure.

FIG. 8 is a view showing an image controlling unit of a display device according to a second embodiment of the present disclosure. Descriptions of components (e.g., frame memory part 131 and mask generating part 133) similar to those in the first embodiment will be omitted or shortened.

In FIG. 8, the image controlling unit 13 includes a frame memory part 131, a mask generating part 133, a smoothing part 134 and a frame processing part 135. In some embodiments, each of the frame memory part 131, the mask generating part 133, the smoothing part 134, and/or a frame processing part 135 may be a circuit. Accordingly, the frame memory part 131, the mask generating part 131, the smoothing part 134, and/or the frame processing part 135 may also be referred to as a frame memory circuit 131, a mask generating circuit 133, a smoothing circuit 134, and/or a frame processing circuit 135, respectively.

The smoothing part 134 receives the nth mask frame M(n) from the mask generating part 133. The smoothing part 134 performs a smoothing treatment to the nth mask frame M(n) to facilitate (alleviate) the change of the luminance value of a border region between the subject and the background. The detailed smoothing treatment may be described below. The smoothing part 134 transmits an nth smoothed mask frame MS(n) obtained through the smoothing treatment to the frame processing part 135. The frame processing part 135 generates the nth luminance emphasis frame HBF(n) and the nth black insertion frame BIF(n) based on the nth smoothed mask frame MS(n). The frame processing part 135 transmits the modified data signal DATAm including the nth luminance emphasis frame HBF(n) and the nth black insertion frame BIF(n) to the data driving unit 14.

Figures 9, 10:
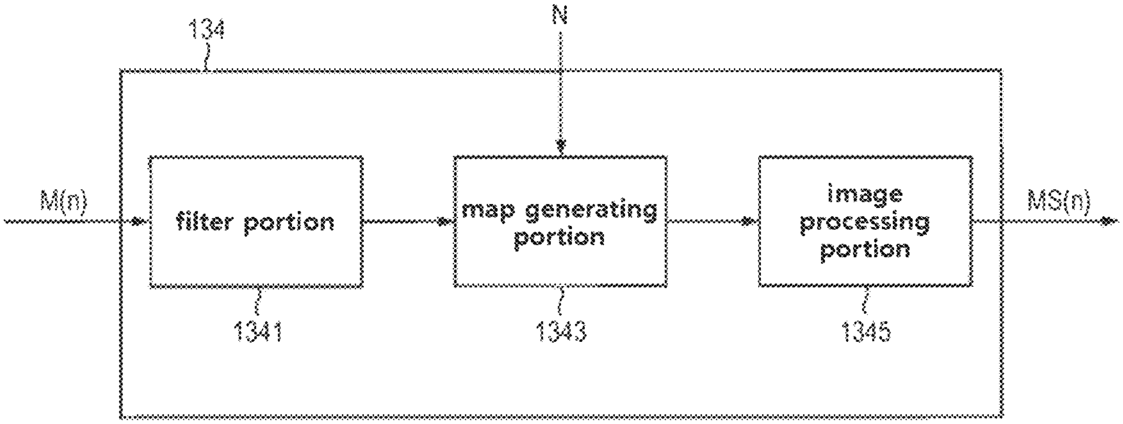
FIG. 9 is a view showing a smoothing part of an image controlling unit of a display device according to a second embodiment of the present disclosure.
FIG. 10 is a view showing a mapping between a filtering result and a concentration of a black color in a smoothing portion of an image controlling unit of a display device according to a second embodiment of the present disclosure.

FIG. 9 is a view showing a smoothing part of an image controlling unit of a display device according to a second embodiment of the present disclosure.

In FIG. 9, the smoothing part 134 includes a filter portion 1341, a map generating portion 1343 and an image processing portion 1345. In some embodiments, each of the filter portion 1341, the map generating portion 1343, and/or the image processing portion 1345 is a circuit. Accordingly, the filter portion 1341, the map generating portion 1343, and/or the image processing portion 1345 may also be referred to as a filter circuit 1341, a map generating circuit 1343, and/or an image processing circuit 1345, respectively.

The filter portion 1341 receives the nth mask frame M(n) from the mask generating part 133. The filter portion 1341 performs a filtering treatment to the nth mask frame M(n). For example, the filter portion 1341 obtains luminance values of one pixel (an interest pixel) and adjacent pixels at a periphery of the interest pixel in the nth mask frame M(n). The filter portion 1341 obtains the number of the pixels corresponding to a black color based on the obtained luminance values. The filter portion 1341 may obtain the luminance values of the pixels in a range (kernel) of 3×3 including the interest pixel in a center and 8 adjacent pixels surrounding the interest pixel. Consecutively, the filter portion 1341 obtains the number of pixels emitting the black color in the range of 3×3 based on the obtained luminance values. The filter portion 1341 repeats the filtering treatment for all pixels constituting the nth mask frame M(n). For example, the filter portion 1341 may determine each pixel as the interest pixel, may obtain the luminance values of the interest pixel and the adjacent pixels at a periphery of the interest pixel and may obtain the number of the pixels emitting the black color based on the luminance values. The filter portion 1341 transmits the number of the pixels in the kernel corresponding to the black color for each pixel to the map generating portion 1343.

The filter portion 1341 may determine a greater range as the kernel. For example, the filter portion 1341 may use a range of 5×5 or a range of 7×7 as the kernel. The filter portion 1341 may assign a weight to each pixel in the kernel. For example, the filter portion 1341 may assign a greater weight to a central portion of the kernel and may assign a smaller weight to an edge portion of the kernel. Further, the filter portion 1341 may obtain the number of pixels emitting the black color based on the pixel values instead of the luminance values.

FIG. 10 is a table showing a mapping between a filtering result and a concentration of a black color in a smoothing portion of an image controlling unit of a display device according to a second embodiment of the present disclosure.

In FIG. 10, the map generating portion 1343 defines a relation of the number of the pixels emitting the black color (black colored pixels) and the concentration of the black color (gray level) of the interest pixel transmitted from the filter portion 1341. The map generating portion 1343 may relate the corresponding interest pixel to the concentration of the black color based on the number of the black colored pixels. The map generating portion 1343 may assign a minimum increment to the concentration change of the black color based on a predetermined number N. For example, the number of the black colored pixels in the range of 3×3 including the interest pixel may be related to the nine concentrations of the black color, the predetermined N is 9, and the minimum increment to the concentration change is assigned as 12.5%. When the number of the black colored pixels in the kernel is 0, the corresponding interest pixel may be related to the concentration of the black color of about 0% (maximum gray level). When the number of the black colored pixels in the kernel is within 1 to 7, the corresponding interest pixel may be related to the concentration of the black color within about 12.5% to about 87.5%, with a minimum increment in concentration differences being 12.5%. When the number of the black colored pixels in the kernel is 8 or 9, the corresponding interest pixel may be related to the concentration of the black color of about 100%

(minimum gray level). The map generating portion 1343 transmits the related result of the interest pixel and the concentration of the black color to the image processing portion 1345.

Figure 11:
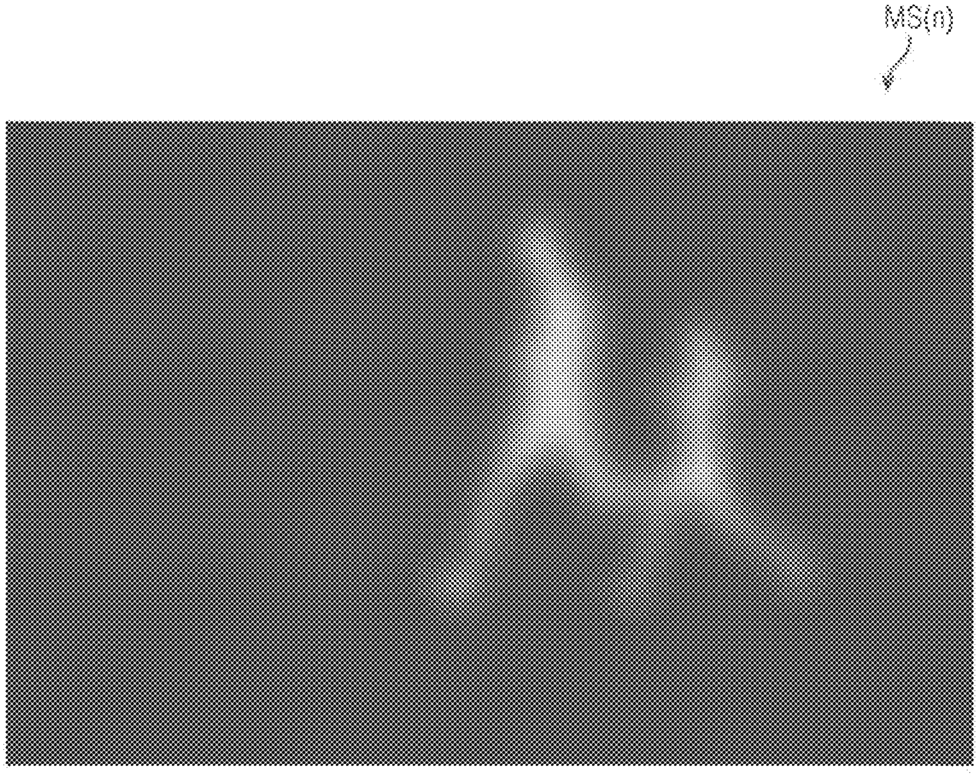
FIG. 11 is a view showing a mask frame generated by a smoothing portion of an image controlling unit of a display device according to a second embodiment of the present disclosure.

FIG. 11 is a view showing a mask frame generated by a smoothing portion of an image controlling unit of a display device according to a second embodiment of the present disclosure.

In FIG. 11, the image processing portion 1345 generates the smoothed mask frame MS(n) obtained through the smoothing treatment based on the related result of the interest pixel and the concentration of the black color. In the nth smoothed mask frame MS(n) generated by the image processing portion 1345, a gray level of an adjacent area to a border (hereinafter, 'border region') of the moving subject between frames and the fixed subject between frames gradually changes. The border region in the nth smoothed mask frame MS(n) may be represented as gray scale. The image processing portion 1345 transmits the nth smoothed mask frame MS(n) to the frame processing part 135.

In FIG. 9, the predetermined number N is inputted to the map generating portion 1343 from an exterior of the smoothing part 134. The predetermined number N may be stored in the map generating portion 1343 in advance or may be stored in an additional memory portion in the smoothing part 134. Further, the predetermined number N may be a fixed value or a variable value.

The frame processing part 135 generates the nth luminance emphasis frame HBF(n) based on a gray level information of each pixel in the nth smoothed mask frame MS(n). In the luminance emphasis frame HBF(n) based on the nth smoothed mask frame MS(n), the luminance of the border region gradually changes. The luminance change of the border region may be realized by adjusting the luminance of the pixel in the border region based on the gray level information of the nth smoothed mask frame MS(n).

The frame processing part 135 may generate the nth black insertion frame BIF(n) based on the gray level information of each pixel in the nth smoothed mask frame MS(n). In the nth black insertion frame BIF(n) based on the nth smoothed mask frame MS(n), the luminance of the border region gradually changes.

The frame processing part 135 transmits the modified data signal DATAm including the nth luminance emphasis frame HBF(n) and the nth black insertion frame BIF(n) based on the nth smoothed mask frame MS(n) to the data driving unit 14.

Figure 12:
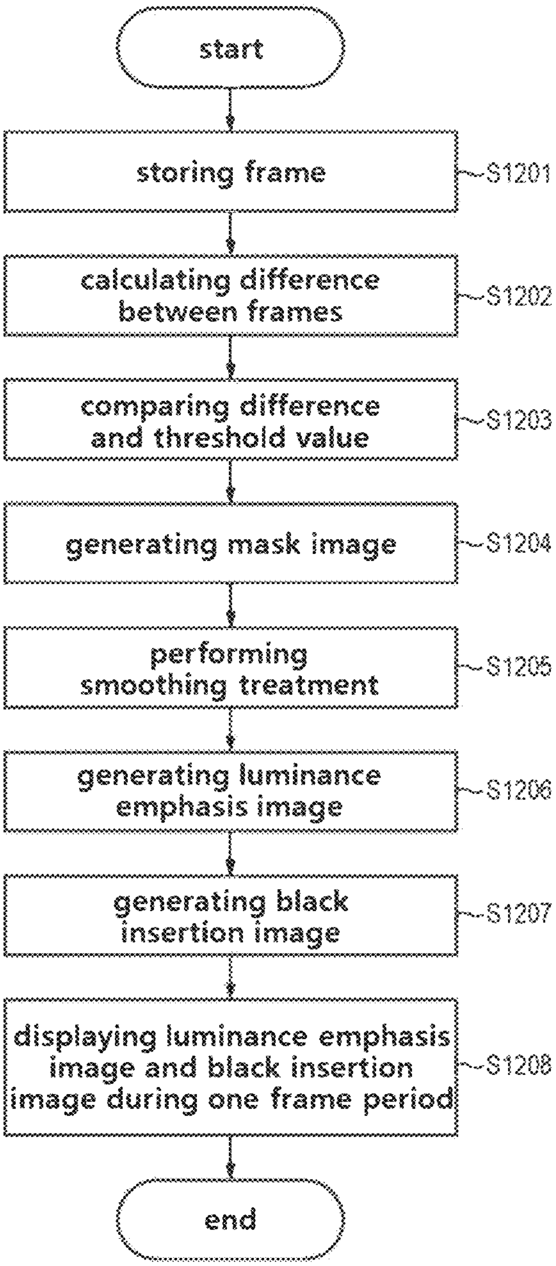
FIG. 12 is a view showing a process performed by an image controlling unit of a display device according to a second embodiment of the present disclosure.

FIG. 12 is a view showing a process performed by an image controlling unit of a display device according to a second embodiment of the present disclosure.

In step S1201, the image controlling unit 13 stores a first frame and a second frame among the plurality of frames in the frame memory part 131.

In step S1202, the image controlling unit 13 calculates a difference of each pixel between the first frame and the second frame and determines an absolute value of the calculated difference.

In step S1203, the image controlling unit 13 compares the absolute value of the calculated difference with a threshold value.

In step S1204, the image controlling unit 13 generates the mask frame (mask image) based on the comparison result.

In step S1205, the image controlling unit 13 performs the smoothing treatment to the mask image to generate a smoothed mask image for facilitating the luminance change of the border region between the moving subject and the fixed subject except for the moving subject and generates the smoothed mask image.

In step S1206, the image controlling unit 13 generates the luminance emphasis frame (luminance emphasis image) based on the smoothed mask image and the first frame.

In step S1207, the image controlling unit 13 generates the black insertion frame (black insertion image) based on the smoothed mask image and the first frame.

In step S1208, the image controlling unit 13 sequentially displays the luminance emphasis image and the black insertion image during one frame period corresponding to the nth frame F(n).

Human vision recognizes a brightness due to an integration of a luminance with respect to a time. When a viewpoint of a human moves in a frame, the integration value of the luminance (brightness recognized by a human) may sharply change in the border region of the moving subject between frames and the background due to the luminance emphasis frame and the black insertion frame. The sharp change may be recognized as a flicker or a residual image by a user. In the display device according to a second embodiment of the present disclosure, the sharp change of the integration value of the luminance in the border region may be suppressed by gradually changing the luminance in the border region. As a result, deterioration such as a flicker or a residual image recognizable in the border region by a user may be suppressed and display quality of a display device is improved.

Figure 13:
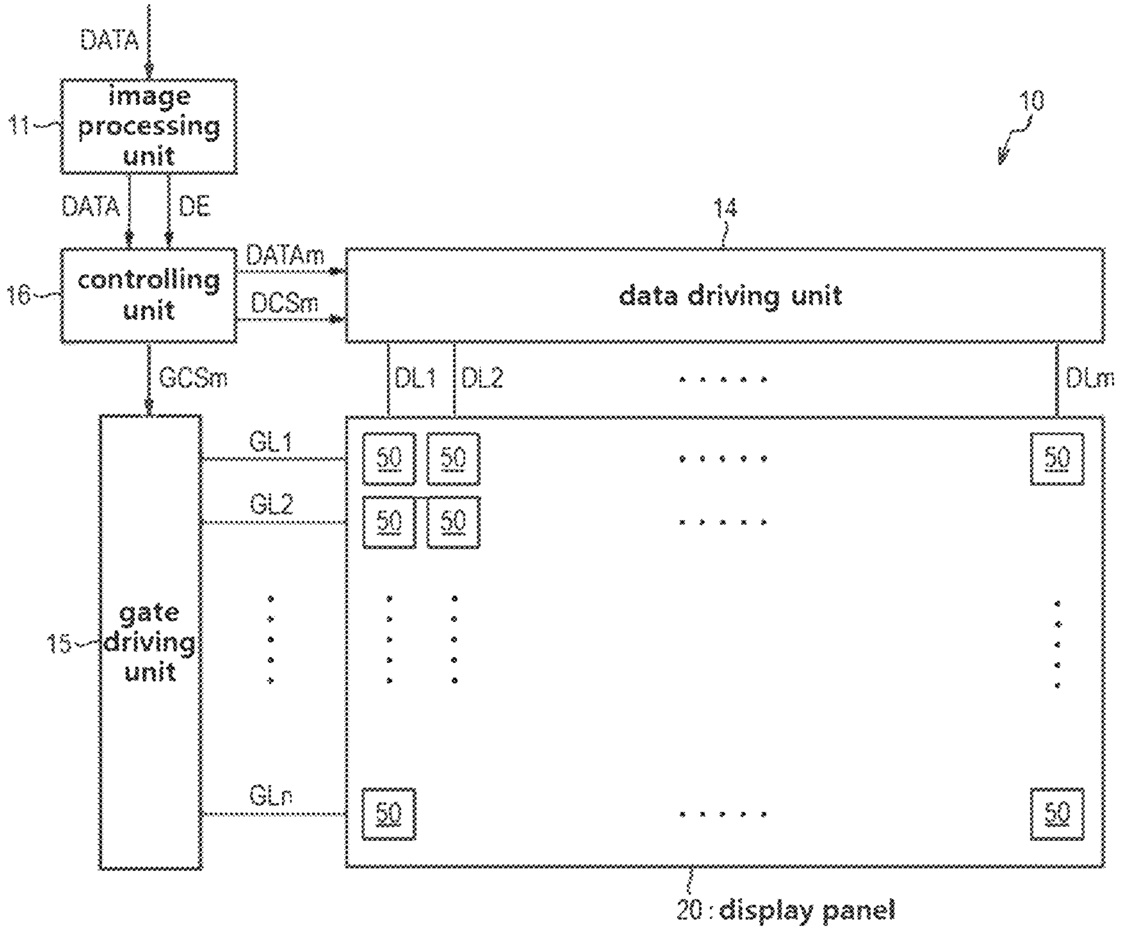
FIG. 13 is a view showing a display device according to a third embodiment of the present disclosure.

FIG. 13 is a view showing a display device according to a third embodiment of the present disclosure.

In FIG. 13, a display device 10 according to a third embodiment of the present disclosure includes an image processing unit 11, a controlling unit 16, a data driving unit 14, a gate driving unit 15 and a display panel 20.

The display device 10 according to first and second embodiments of the present disclosure includes the image controlling unit 13 as a controller independent from the timing controlling unit 12. The image controlling unit 13 may be integrated to the timing controlling unit 12. The display device 10 according to a third embodiment of the present disclosure includes the controlling unit 16 as one chip. The controlling unit 16 receives a data signal DATA from the image processing unit 11. Further, the controlling unit 16 receives a driving signal including a data enable signal DE from the image processing unit 11. The controlling unit 16 generates a data control signal DCS and a gate control signal GCS based on the driving signal. The controlling unit 16 converts the data signal DATA into a modified data signal DATAm. The modified data signal DATAm includes an nth luminance emphasis frame HBF(n) and an nth black insertion frame BIF(n). The controlling unit 16 converts the data control signal DCS and the gate control signal GCS into a modified data control signal DCSm and a modified gate control signal GCSm, respectively, according to the modified data signal DATAm. The controlling unit 16 is electrically connected to the data driving unit 14 and the gate driving unit 15. The controlling unit 16 transmits the modified data signal DATAm and the modified data control signal DCSm to the data driving unit 14. Further, the controlling unit 16 transmits the modified gate control signal GCSm to the gate driving unit 15. The controlling unit 16 of a third embodiment is formed of one chip to provide all functions of the timing controlling unit 12 and the image controlling unit 13 of first and second embodiments.

Each component described with respect to the first to third embodiments may be realized by a processor and a memory cooperating with the processor. The memory may store a program or instructions that are executable by the processor. For example, the processor may read a program or instructions stored in the memory, perform the corresponding program or instructions and function as one or more components described with respect to the first to third embodiments. In some embodiments, one or more components described with respect to the first to third embodiments may include a memory storing instructions and one or more processors configured to execute the instructions stored in the memory to perform the functions of the corresponding one or more components. Further, the memory cooperating with the corresponding processor may have a non-volatile type.

In the display device according to first to third embodiments of the present disclosure, deterioration of a light emitting element is suppressed.

It will be apparent to those skilled in the art that various modifications and variation can be made in the present disclosure without departing from the scope of the disclosure. Thus, it is intended that the present disclosure cover the modifications and variations of this disclosure provided they come within the scope of the appended claims.

Embodiments described herein include a display device comprising a display panel and a controlling circuit. The display panel includes a plurality of pixels. Each of the plurality of pixels includes a light emitting element that emits light. The controlling circuit is configured to output image data to the display panel based on a first frame of data and a second frame of data that is arranged after the first frame of data. A subject in the image data moves across the first frame of data and the second frame of data. The controlling circuit includes a frame generating circuit configured to generate for the first frame of data a luminance emphasis frame having a luminance value of the subject that is increased relative to a luminance value of the subject in the first frame of data, and a black insertion frame where a black color is inserted into the subject to replace a color of the subject in the first frame of data. The controlling circuit further includes a frame outputting circuit configured to sequentially output the luminance emphasis frame and the black insertion frame to the display panel instead of the first frame of data. The display panel displays the luminance emphasis frame and the black insertion frame after the luminance emphasis sframe.

In some embodiments, the controlling circuit further includes a motion detecting circuit configured to detect the subject based on a difference between the first frame of data and the second frame of data in the image data.

In some embodiments, the motion detecting circuit generates a mask frame of data that identifies the subject based on the difference between the first frame of data and the second frame of data.

In some embodiments, the first frame of data includes a plurality of first pixel values and the second frame of data includes a plurality of second pixel values. The motion detecting circuit is configured to calculate a difference in each of the plurality of first pixel values in the first frame of data and a corresponding second pixel value from the plurality of second pixel values in the second frame of data, compare an absolute value of each calculated difference with a threshold value, and generates the mask frame of data based on the comparison of the absolute value of each calculated difference and the threshold value.

In some embodiments, the mask frame of data is a binary image generated based on the comparison of the absolute value and the threshold value. For a pixel where the difference in pixel values is greater than the threshold value, a corresponding pixel in the mask frame of data is assigned a first binary value. For a pixel where the difference in pixel values is less than the threshold value, a corresponding pixel in the mask frame of data is assigned a second binary value different from the first binary value.

In some embodiments, the mask frame of data identifies a portion in the first frame of data having absolute values that are greater than the threshold value as the subject, and identifies a portion in the first frame of data having absolute values less than the threshold value as a fixed portion not moving between the first frame of data and the second frame of data.

In some embodiments, the image data includes a sequence of frames of data, and the first frame of data and the second frame of data are consecutive frames of data in the sequence of frames of data in the image data.

In some embodiments, the frame generating circuit is further configured to identify a portion in the first frame of data as the subject based on the mask frame of data, and generates the luminance emphasis frame by increasing a luminance value of the portion corresponding to the subject in the first frame of data.

In some embodiments, in the luminance emphasis frame, a remaining portion that does not correspond to the subject retains a same luminance value as a corresponding portion in the first frame of data.

In some embodiments, the frame generating circuit identifies a portion in the first frame of data as the subject based on the mask frame of data, and generates the black insertion frame by inserting a black color into the portion corresponding to the subject in the first frame of data.

In some embodiments, in the black insertion frame, a remaining portion that does not correspond to the subject retains a same luminance as a corresponding portion in the first frame of data.

In some embodiments, responsive to determining that the subject is absent in the first frame of data and the second frame of data, the frame generating circuit generates the luminance emphasis frame and the black insertion frame having a same average luminance. In some embodiments, the luminance emphasis frame and the black insertion frame are same.

In some embodiments, a combination of a first period during which the luminance emphasis frame is displayed and a second period during which the black insertion frame is displayed is equal to a period corresponding to the first frame of data.

In some embodiments, a duration of the first period during which the luminance emphasis frame is displayed and a duration of the second period during which the black insertion frame is displayed are same.

In some embodiments, the luminance value of the subject in the luminance emphasis frame is twice the luminance value of the subject in the first frame of data.

In some embodiments, the controlling circuit further comprises a smoothing circuit configured to change a luminance value of a border region of the subject in the mask frame of data, the boarder region of the subject corresponds to a region around a boundary of the subject, but does not include the subject.

In some embodiments, the smoothing circuit changes a pixel value in the border region of the subject in the mask frame of data to a gray scale pixel value and outputs a smoothed mask frame of data based on the changed pixel value in the border region.

In some embodiments, the smoothing circuit obtains a number of pixels adjacent the border region of the subject in the mask frame of data having a black color based on luminance values or pixel values of the pixels adjacent to the border region in the mask frame of data, and changes a luminance value or a pixel value of at least one of the pixels in the border region of the subject in the mask frame of data to a gray level pixel value based on the number of pixels having the black color.

In some embodiments, the frame generating circuit generates the luminance emphasis frame where the luminance value of the border region is changed based on the smoothed mask frame of data.

In some embodiments, the frame generating circuit generates the black insertion fame where the luminance value of the border region is changed based on the smoothed mask frame of data.

In some embodiments, the light emitting element includes a light emitting diode.

What is claimed is:

1. A display device, comprising:

a display panel comprising a plurality of pixels, each of the plurality of pixels including a light emitting element that emits light; and a controlling circuit configured to output image data to the display panel based on a first frame of data and a second frame of data that is arranged after the first frame of data, wherein a subject in the image data moves across the first frame of data and the second frame of data wherein the controlling circuit comprises:

a frame generating circuit configured to generate for the first frame of data a luminance emphasis frame having a luminance value of the subject that is increased relative to a luminance value of the subject in the first frame of data and a black insertion frame where a black color is inserted into the subject to replace a color of the subject in the first frame of data; and a frame outputting circuit configured to sequentially output the luminance emphasis frame and the black insertion frame to the display panel instead of the first frame of data, wherein the display panel displays the luminance emphasis frame and the black insertion frame after the luminance emphasis frame.

2. The display device of claim 1, wherein the controlling circuit further comprises a motion detecting circuit configured to detect the subject based on a difference between the first frame of data and the second frame of data in the image data.

3. The display device of claim 2, wherein the motion detecting circuit generates a mask frame of data that identifies the subject based on the difference between the first frame of data and the second frame of data.

4. The display device of claim 3, wherein the first frame of data includes a plurality of first pixel values and the second frame of data includes a plurality of second pixel values, and the motion detecting circuit is configured to:

calculate a difference in each of the plurality of first pixel values in the first frame of data and a corresponding second pixel value from the plurality of second pixel values in the second frame of data;

compare an absolute value of each calculated difference with a threshold value; and generate the mask frame of data based on the comparison of the absolute value of each calculated difference and the threshold value.

5. The display device of claim 4, wherein the mask frame of data is a binary image generated based on the comparison of the absolute value and the threshold value, for a pixel where the difference in pixel values is greater than the threshold value, a corresponding pixel in the mask frame of data is assigned a first binary value, and for a pixel where the difference in pixel values is less than the threshold value, a corresponding pixel in the mask frame of data is assigned a second binary value different from the first binary value.

6. The display device of claim 5, wherein the mask frame of data:

identifies a portion in the first frame of data having absolute values that are greater than the threshold value as the subject; and identifies a portion in the first frame of data having absolute values that are less than the threshold value as a fixed portion not moving between the first frame of data and the second frame of data.

7. The display device of claim 6, wherein the image data includes a sequence of frames of data, and the first frame of data and the second frame of data are consecutive frames of data in the sequence of frames of data in the image data.

8. The display device of claim 4, wherein the frame generating circuit:

identifies a portion in the first frame of data as the subject based on the mask frame of data; and generates the luminance emphasis frame by increasing a luminance value of the portion corresponding to the subject in the first frame of data.

9. The display device of claim 8, wherein in the luminance emphasis frame, a remaining portion that does not correspond to the subject retains a same luminance value as a corresponding portion in the first frame of data.

10. The display device of claim 4, wherein the frame generating circuit:

identifies a portion in the first frame of data as the subject based on the mask frame of data; and generates the black insertion frame by inserting a black color into the portion corresponding to the subject in the first frame of data.

11. The display device of claim 10, wherein in the black insertion frame, a remaining portion that does not correspond to the subject retains a same luminance as a corresponding portion in the first frame of data.

12. The display device of claim 4, wherein responsive to determining that the subject is absent in the first frame of data and the second frame of data, the frame generating circuit generates the luminance emphasis frame and the black insertion frame having a same average luminance value.

13. The display device of claim 12, wherein the luminance emphasis frame and the black insertion frame are same.

14. The display device of claim 1, wherein a combination of a first period during which the luminance emphasis frame is displayed and a second period during which the black insertion frame is displayed is equal to a period corresponding to the first frame of data.

15. The display device of claim 14, wherein a duration of the first period during which the luminance emphasis frame is displayed and a duration of the second period during which the black insertion frame is displayed are same.

16. The display device of claim 1, wherein the luminance value of the subject in the luminance emphasis frame is twice the luminance value of the subject in the first frame of data.

17. The display device of claim 3, wherein the controlling circuit further comprises a smoothing circuit configured to change a luminance value of a border region of the subject in the mask frame of data, the border region of the subject corresponds to a region around a boundary of the subject, but does not include the subject.

18. The display device of claim 17, wherein the smoothing circuit changes a pixel value in the border region of the subject in the mask frame of data to a gray scale pixel value and outputs a smoothed mask frame of data based on the changed pixel value in the border region.

19. The display device of claim 18, wherein the smoothing circuit:

obtains a number of pixels adjacent the border region of the subject in the mask frame of data having a black color based on luminance values or pixel values of the pixels adjacent to the border region in the mask frame of data; and changes a luminance value or a pixel value of at least one of the pixels in the border region of the subject in the mask frame of data to a gray level pixel value based on the number of pixels having the black color.

20. The display device of claim 19, wherein the frame generating circuit generates the luminance emphasis frame where the luminance value of the border region is changed based on the smoothed mask frame of data.

21. The display device of claim 19, wherein the frame generating circuit generates the black insertion frame wherein the luminance value of the border region is changed based on the smoothed mask frame of data.

22. The display device of claim 1, wherein the light emitting element includes a light emitting diode.

* * * * *